(12) United States Patent
Greathouse

(10) Patent No.: US 8,014,850 B2
(45) Date of Patent: Sep. 6, 2011

(54) INITIATION OF DYNAMIC DATA ACQUISITION

(75) Inventor: William G. Greathouse, Brecksville, OH (US)

(73) Assignee: GVI Technology Partners, Ltd., Twinsberg, OH (US)

( * ) Notice: Subject to any disclaimer, the term of this patent is extended or adjusted under 35 U.S.C. 154(b) by 1622 days.

(21) Appl. No.: 11/171,028

(22) Filed: Jun. 30, 2005

(65) Prior Publication Data

US 2006/0004277 A1    Jan. 5, 2006

Related U.S. Application Data

(60) Provisional application No. 60/584,788, filed on Jul. 1, 2004.

(51) Int. Cl.
*A61B 6/00* (2006.01)

(52) U.S. Cl. .................................. 600/431; 600/436

(58) Field of Classification Search ............... 600/407, 600/425, 436, 431; 378/51, 62
See application file for complete search history.

(56) References Cited

U.S. PATENT DOCUMENTS

| | | | |
|---|---|---|---|
| 4,151,416 A | 4/1979 | Richey et al. | |
| 4,223,221 A | 9/1980 | Gambini et al. | |
| 4,424,446 A | 1/1984 | Inbar et al. | |
| 4,882,494 A | 11/1989 | Rogers et al. | |
| 4,899,054 A | 2/1990 | Barfod | |
| 5,079,424 A | 1/1992 | Kobayashi | |
| 5,171,986 A | 12/1992 | Loomis et al. | |
| 5,237,173 A | 8/1993 | Stark et al. | |
| 5,412,215 A | 5/1995 | Shuto et al. | |
| 5,550,377 A | 8/1996 | Petrillo et al. | |
| 5,608,221 A * | 3/1997 | Bertelsen et al. | 250/363.03 |
| 5,646,408 A | 7/1997 | Goldberg et al. | |
| 5,677,536 A | 10/1997 | Vickers | |
| 5,684,850 A | 11/1997 | Warburton et al. | |
| 6,087,656 A | 7/2000 | Kimmich et al. | |
| 6,134,293 A | 10/2000 | Guendel | |
| 6,342,698 B1 | 1/2002 | Stark | |
| 6,525,320 B1 | 2/2003 | Juni | |
| 6,525,321 B2 | 2/2003 | Juni | |
| D474,277 S | 5/2003 | Juni | |
| 6,757,423 B1 | 6/2004 | Amini | |
| D492,998 S | 7/2004 | Juni | |
| 7,012,257 B2 | 3/2006 | Juni | |
| 7,015,476 B2 | 3/2006 | Juni | |
| 7,071,473 B2 | 7/2006 | Juni | |

(Continued)

FOREIGN PATENT DOCUMENTS

WO    02099459 A1    12/2002

OTHER PUBLICATIONS

International Search Report, dated Jun. 26, 2006.

*Primary Examiner* — Long V Le
*Assistant Examiner* — Jacqueline Cheng
(74) *Attorney, Agent, or Firm* — Pearne & Gordon LLP

(57) ABSTRACT

Provided is a data acquisition system comprising a CPU, radiation detector, buffer, and a storage device in communication with the buffer and which is capable of storing information received from the buffer. The data acquisition system includes a method for sequentially monitoring data from one region of interest based on data obtained from a previous region of interest, and finally recording the data of a final region of interest for use as medical data.

32 Claims, 8 Drawing Sheets

U.S. PATENT DOCUMENTS

| | | |
|---|---|---|
| 7,105,825 B2 | 9/2006 | Juni |
| 7,158,661 B2 | 1/2007 | Inoue |
| 7,339,174 B1 | 3/2008 | Hugg et al. |
| 7,346,381 B2 | 3/2008 | Okerlund et al. |
| 2002/0068864 A1* | 6/2002 | Bishop et al. .......... 600/407 |
| 2002/0163996 A1 | 11/2002 | Kerrien et al. |
| 2003/0057375 A1 | 3/2003 | Williams et al. |
| 2003/0136912 A1 | 7/2003 | Juni |

\* cited by examiner

INITIATION OF DYNAMIC DATA ACQUISITION

CROSS-REFERENCESS TO RELATED APPLICATIONS

This application claims the benefit of provisional application 60/584,788 filed on Jul. 1, 2004, incorporated by reference. Co-pending non-provisional applications directed at related technologies, Ser. No. 11/140,337, filed on May 27, 2005; Ser. No. 11/140,336, filed on May 27, 2005; and Ser. No. 11/101,673, filed on Apr. 8, 2005 are each herein incorporated by reference in their entirety.

FIELD OF THE INVENTION

This application relates generally to a medical imaging apparatus and method.

More specifically, this application relates to an apparatus and method for automatically initiating the acquisition of dynamic data by a nuclear medicine imaging system.

BACKGROUND OF THE INVENTION

In the field of Medical Imaging, one modality is nuclear medicine (gamma camera) imaging. This uses a detector consisting of a scintillator backed by a plurality of photomultiplier tubes (PMTs) with appropriate electronics. A patient is given a radioisotope either by injection or ingestion and the detector(s), after being placed in close proximity to the patient, can determine where the radioisotope goes or has gone.

When the radioisotope emits a gamma photon in the direction of the detector, it is absorbed by the scintillator. The scintillator emits a flash of light (a scintilla) which is detected by the plurality of PMTs. The PMTs nearest to the flash receive a stronger signal than those further away. By measuring the intensity of the flash at each PMT, then performing a calculation, for example a centroid type calculation, a fairly accurate estimation of where the flash occurred is possible.

The output of the PMTs is an electrical current proportional to the amount of light detected by each PMT. The PMT output current can be converted into a voltage and amplified, then integrated to derive the total energy (light) detected by each PMT.

In nuclear medicine imaging, dynamic time varying data may be acquired during the first transit of the bolus of the injected radiotracer. This data may be stored for on demand processing and review. The total energy and position information may be used together or individually to limit whether the information is accepted for later processing or storage. The combination of position and energy information represents a single event.

One method for starting the storage of acquisition data for gamma cameras can involve a manual interaction and initiation of the starting point for the storage of acquired data. This manual start may be further qualified by incorporating a count down timer function or event rate detection. A manual start may include a second person to initiate the acquisition on command, sometimes referred to as "shout and start". Another derivative of the manual start can include the use of a remote mechanical switch, for example a foot pedal switch, which can be actuated by an operator to initiate the acquisition of data.

A time invariant alternative to manual initiation of data acquisition may include monitoring for a specified event rate level to initiate acquisition. However, when the sensitivity of this method is set sufficiently low to begin the capturing of data at the first appearance of the activity, there may be a tendency to falsely trigger due to activity entering the field of view independently of the acquisition of interest. An event rate level starting system may suffer from false starts due to normal changes in the environment resulting in activity increases not associated with the acquisition interval of interest. Also, when set to a level to avoid inadvertent triggering, substantial pre-start condition data may not be available for analysis.

During the transit of the bolus, it may be desirable to start acquiring data at a time that provides complete storage of the time interval of interest while minimizing the storage of unnecessary and uninteresting time intervals. The use of manual methods for beginning the acquisition of data may increase an operator's workload or require the introduction of, and communication with, a second operator. The use of time invariant automatic methods for beginning the acquisition of the data may not provide a consistent and repeatable method for storage or take in to account the variable nature of the setup and initiation of the acquisition.

The quality and repeatability of acquisitions of the prior art is wanting, however. Operator variability and the need for multiple operators is a major shortcoming. It would be desirable to provide automatic acquisition interval identification and storage in an attempt to eliminate problems associated with prior manual, count down timer, and simple event level starting systems, or a combination of those systems.

SUMMARY OF THE INVENTION

Provided is a method of acquiring medical data using a data acquisition system including a radiation detector, the method comprising the steps of:
  acquiring a first set of data from a monitored region that is a first region of interest;
  for n=2 to N, performing the steps of:
    a) detecting an $(n-1)^{th}$ trigger condition based on the $(n-1)^{th}$ set of data,
    b) defining an $n^{th}$ region of interest in response to the $(n-1)^{th}$ trigger condition;
    c) acquiring an $n^{th}$ set of data from the $n^{th}$ region of interest; and
    d) repeating steps (a) and (c) for each value of n, where N is equal to or greater than 3; and then
  recording the $N^{th}$ set of data for including in the medical data.

Also provided is a method of acquiring medical data using a data acquisition system including a radiation detector, the method comprising the steps of:
  using the radiation detector for acquiring data from a monitored region that is a first region of interest;
  using the radiation detector for acquiring data from a temporally arranged series of regions of interest; and
  storing a portion of the data obtained from the last region of interest for including in the medical data, wherein
  each subsequent region of interest is based on the data acquired from the previous region of interest.

Further provided is a data acquisition system for acquiring medical data, the system comprising: a radiation detector for acquiring data from a monitored region that is a first region of interest and then also for acquiring data from a temporally arranged series of regions of interest; a buffer for temporarily storing a portion of the acquired data, and a storage device.

The system is adapted for acquiring the data such that each subsequent region of interest is based on the data acquired from the previous region of interest, and some portion of the data collected from the final region of interest is transferred from the buffer to the storage device for including in the medical data.

Still further provided is a data acquisition system for acquiring medical data, the system comprising: a radiation detector including a plurality of PMTs for acquiring data including temporal and spatial location information from a monitored region that is a first region of interest and then also for acquiring data from a temporally arranged series of three or more regions of interest. Each subsequent region of interest is different than the preceding region of interest, and each region of interest is a subset of the monitored region.

The above system also providing a buffer for temporarily storing a portion of the acquired data for a given time interval; a storage device; and a processor for controlling the acquiring of the data such that each subsequent region of interest is automatically selected based on the data acquired from the previous region of interest. The processor also automatically issues a command to copy some portion of the data collected from the final region of interest from the buffer to the storage device for including in the medical data.

BRIEF DESCRIPTION OF THE DRAWINGS

The features and advantages of the present invention will become apparent to those skilled in the art to which the present invention relates upon reading the following description of example embodiments with reference to the accompanying drawings, in which.

DETAILED DESCRIPTION OF THE PREFERRED EMBODIMENTS

Provided is a data acquisition system comprising a buffer, a storage device in communication with the buffer and which is capable of storing information received from the buffer, and a monitored region, which is comprised of a region of interest, wherein data acquired from the monitored region during an adjustable time interval is temporarily stored in the buffer, and further wherein the data is comprised of time and spatial location information, and further wherein the data acquisition system is capable of automatically recording future data when the data acquired from the monitored region and stored in the buffer meet predetermined parameters.

The apparatus and method disclosed herein improves upon existing data acquisition systems and methods by incorporating a continuous monitoring and recording of the acquisition data for specific spatial and temporal boundaries, alone or in combination, to determine an accurate and repeatable interval for data capture and storage. The monitoring and recording method may be implemented by using, for example, software, hardware, reconfigurable hardware and firmware, or a combination of software, hardware, and reconfigurable hardware and firmware.

Much of the method of the invention can be implemented in software for execution on a computer processor. The code can be compiled and executed on a Posix compliant computer and operating system, for example. The appropriate libraries for retrieving and storing the data would then be provided for the specific implementation.

The apparatus and method disclosed herein may improve the quality and repeatability of acquisitions through the precise nature of the triggering mechanism and by removing operator variability and the need for multiple operators. Automatic acquisition interval identification and storage as described herein may eliminate problems associated with prior manual, count down timer, and simple event level starting systems, or a combination of those systems.

Figure 1:
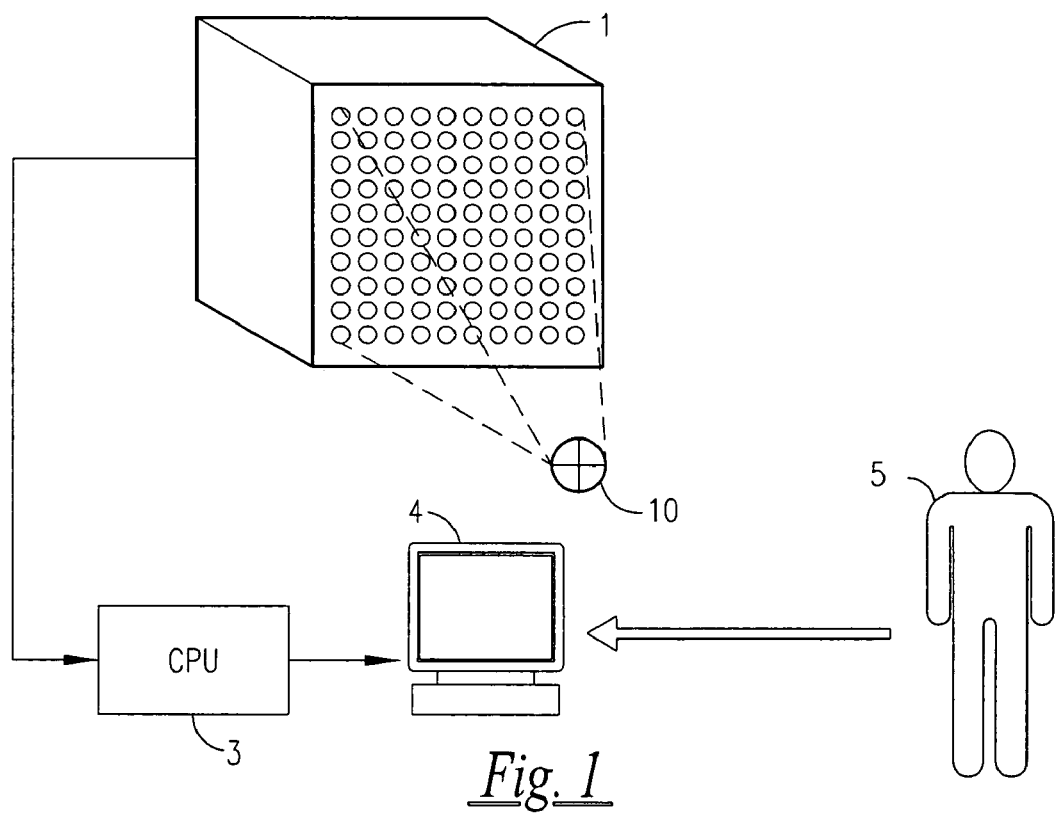
FIG. 1 is a diagram showing one potential radiation detector setup.

FIG. 1 is a block diagram showing a radiation detector in the context of one potential use of the invention for the radiation detector. FIG. 1 shows a radiation detector 1, connected to a processor 3, which is connected to a Graphical User Interface (GUI) 4 for displaying information to a technician/operator 5. The detector 1 includes a plurality of photo-multiplier tubes (PMTs) for detecting scintilla generated by a scintillation crystal which has absorbed gamma rays (photons) radiated from a radiation source 10.

Figure 1A:
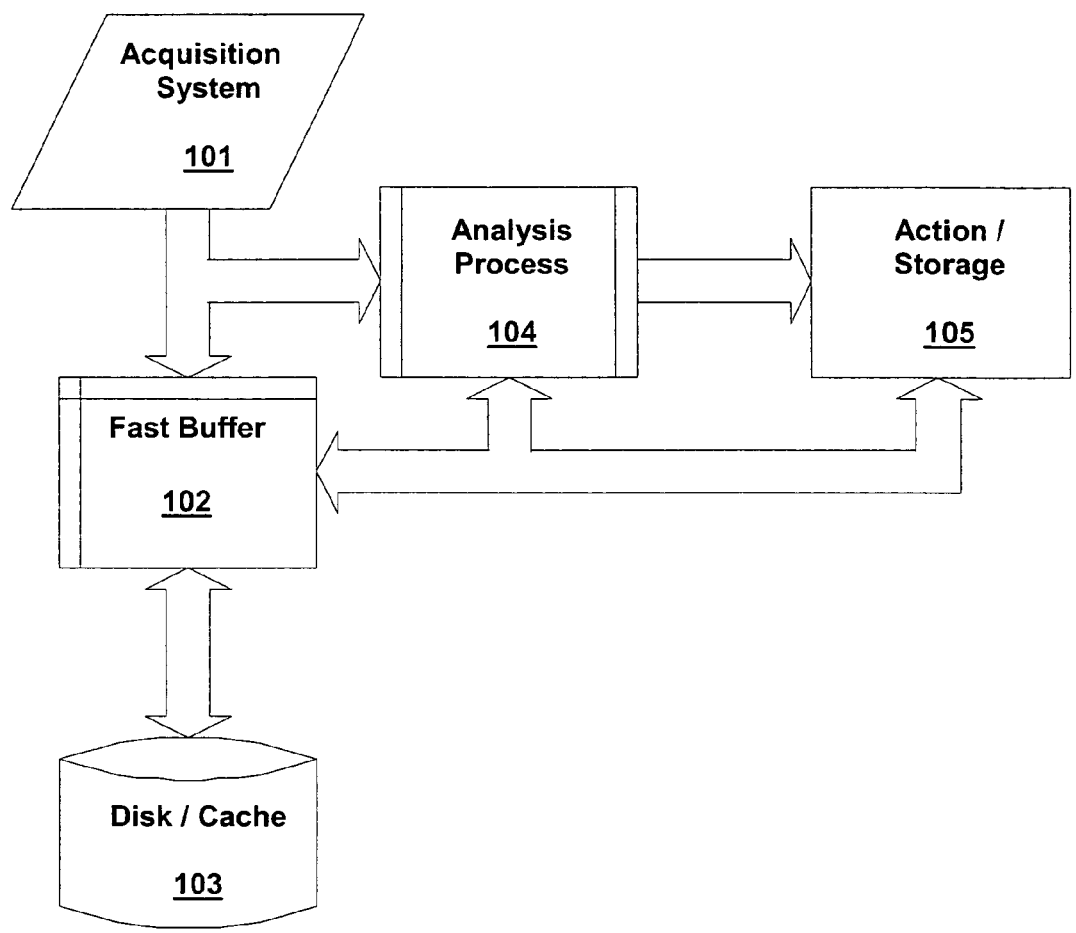
FIG. 1*a* is a system function block diagram of an embodiment of the invention used with the detector setup of FIG. 1.

FIG. 1*a* is a function block diagram overview of an embodiment of the data acquisition and analysis system that can be used for the detector system of FIG. 1. The event data as it is received from the acquisition system 101 is recorded in a fast memory buffer 102 of a size and configuration to allow the recording of a specified and changeable time interval. The fast memory buffer 102 can be configured as a continuous circular buffer, for example. The position and time of each event data is recorded. This allows the analysis of the data for certain predefined and variable qualifying conditions without temporal discontinuity of the recorded data resulting from the defined and changeable pre-start and post-start time recording intervals and with regard to the maximal data rates to be recorded.

The fast memory storage may be supplemented with disk file, or cache, for example, the disk/cache 103. The data is analyzed in parallel through an analysis/process 104, implemented in software running on a general purpose or specialized processor, or hardware, or reconfigurable hardware and firmware, or a combination of software, hardware, and reconfigurable hardware and firmware. For example, the CPU of FIG. 1.

The desired data and analysis results are recorded and a defined interval appropriate to the acquisition protocol and analysis to be performed is then transferred for further action or storage 105, which can be a disc drive, tape drive, CD or DVD writable drive, etc., or a more temporary storage system, such as RAM, for example. Dependent on the specific imaging protocol, the data may be combined and/or modified spatially and/or temporally, as desired. For a dynamic cardiac acquisition, as in the example, the data may be reduced to a representative matrix with specific dimensions and time intervals—for example, a 64×64 image matrix with 50 milliseconds of data per image. Or, dependent on the protocol, the data may be stored without modification for future processing, analysis, or viewing.

The dynamic data can be analyzed to identify an appropriate temporal trigger point, which is preceded and followed by defined and changeable pre-start and post-start intervals, respectively. The pre-start and post-start intervals are dependent on the specific imaging protocol. For example, during a dynamic cardiac first transit acquisition, it is desirable to record data that is fully representative of the bolus transit. The pre-start interval may be defined to be a fixed time period selected by the user empirically or may be derived from the current event information. This interval is selected or calculated to provide a complete recording of the entry of the bolus within the field of view. A typical pre-start value for a dynamic cardiac first transit acquisition is 3 seconds, for exaple. The post-start interval may be a fixed time period selected by the user empirically or may be determined from the subsequent events. This time interval is selected to provide a complete recording of the bolus transit through the cardiac chambers. A typical post-start value for a dynamic cardiac first transit acquisition is 30 seconds, for example.

The trigger point may be defined by single, or multiple, conditions acted on sequentially, or in parallel. For example, the conditional trigger may be defined in terms of temporal and spatial changes within monitored areas of interest. The areas may be defined as fixed or dynamic regions based on predicted and/or actual received data. These monitored areas of interest may incorporate the entire field of view, or a subset or subsets of the field of view, either continuous or discontinuous. When a conditional trigger condition or set of conditions has been identified and accepted within the selected area or areas of interest, subsequent further refinement of the trigger condition may occur based on additional conditions and areas of interest, and the monitored areas can be changed according to the previously monitored area data acquisition results.

For example, a trigger condition may be defined by the following: (i) steady state event conditions within predefined and changeable spatial and temporal limits; (ii) change in event temporal or spatial distribution over a defined and changeable time interval; and/or (iii) a combination of events monitored in parallel or sequentially.

Subsequent trigger conditions may be defined as temporally and/or spatially dependent or independent of the prior triggers. A subsequent trigger spatial region of interest may be defined as a subset of a prior trigger condition spatial region of interest, or even a superset of the prior region of interest.

As an example, an initial monitored region comprising the full spatial field of view may be defined for a trigger, followed by a subsequent trigger spatial region of interest consisting of a smaller subset of the monitored region dependent on a center of mass of the observed activity, followed by a still subsequent trigger condition with an unconnected new spatial region of interest. In the same way, temporal trigger conditions may overlap in time.

Figure 2:
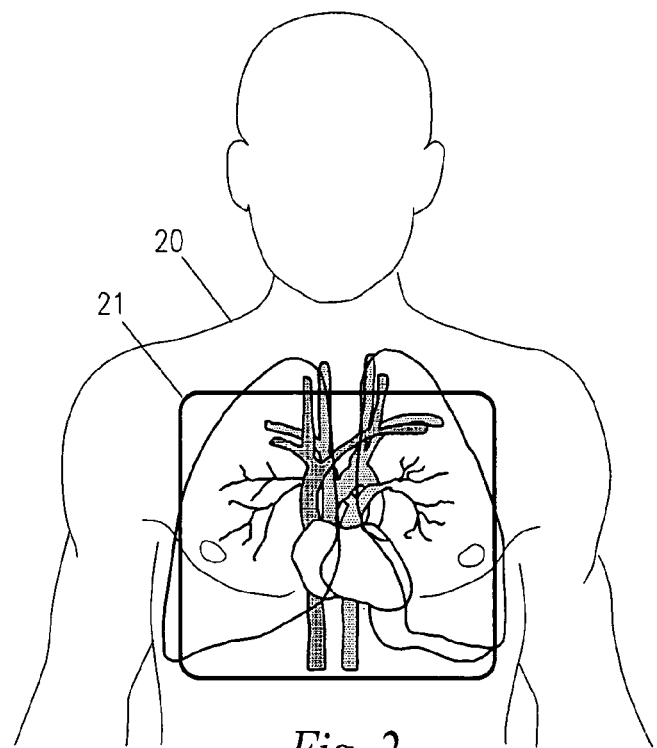
FIG. 2 is a first imaging field of view for an example use of the invention for a cardiac monitoring system.
Figure 3:
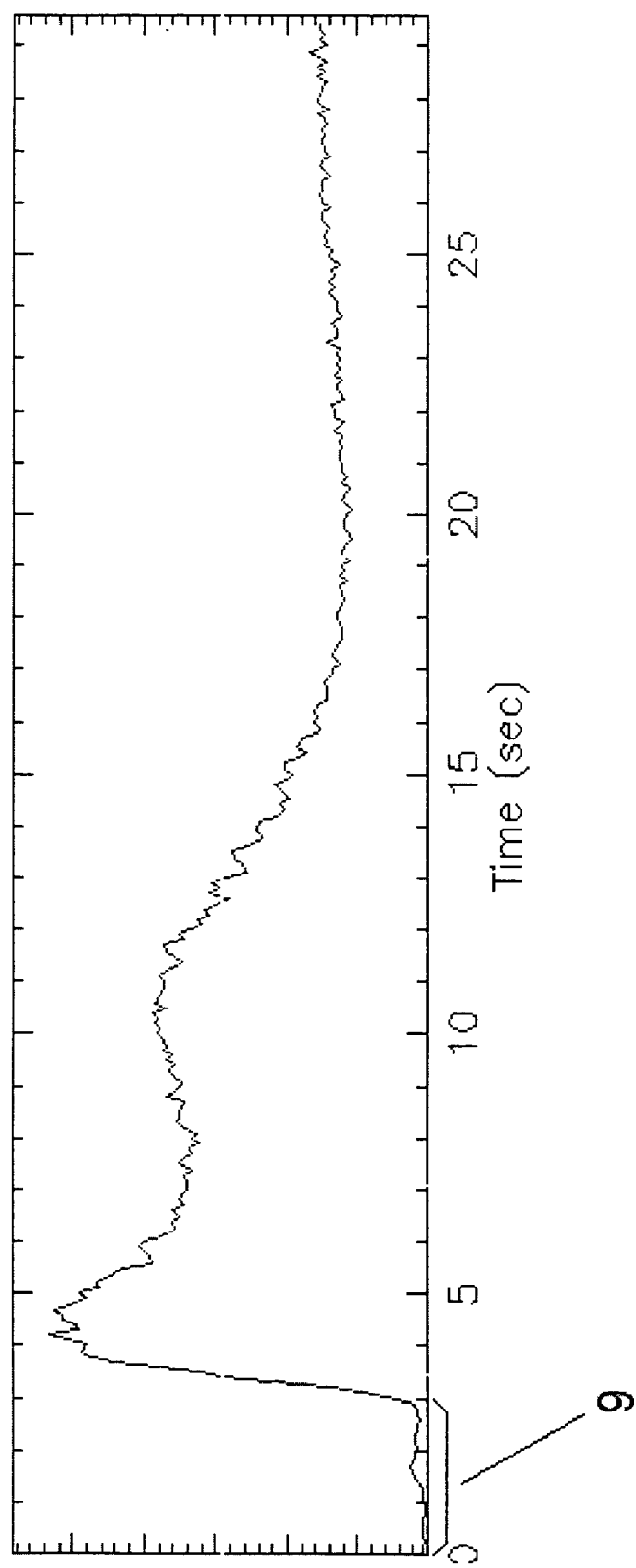
FIG. 3 is an activity profile of acquired data for the first imaging field of view shown in FIG. 2.

For an example embodiment for a first pass cardiac scan, a cardiac first transit acquisition arrangement is shown schematically in FIG. 2, with an imager 21, and its corresponding full field of view as the initial monitored region, encompassing the heart, lungs, and the major blood vessels. In one embodiment of the present invention, a trigger and storage configuration definition may include the following characteristics, based on a first pass bolus transit for cardiac data acquisition:

1) Monitor and retain 30 seconds of data events in a circular buffer while waiting to satisfy trigger conditions. The data events are retained with spatial, energy, and temporal information as appropriate for the required trigger conditions. The full field of view of the imager 21 would see an activity profile similar to that shown in FIG. 3. This is representative of the complete first transit and subsequent redistribution of the bolus of activity as observed over the heart and lungs.

2) First trigger condition: a steady state condition with full field of view (non-focal) event distribution for 3 seconds, with maximum event delta of 2000 events per second as measured in 100 ms intervals. When this first trigger condition 9 is met, continue to the second trigger condition.

Figure 4:
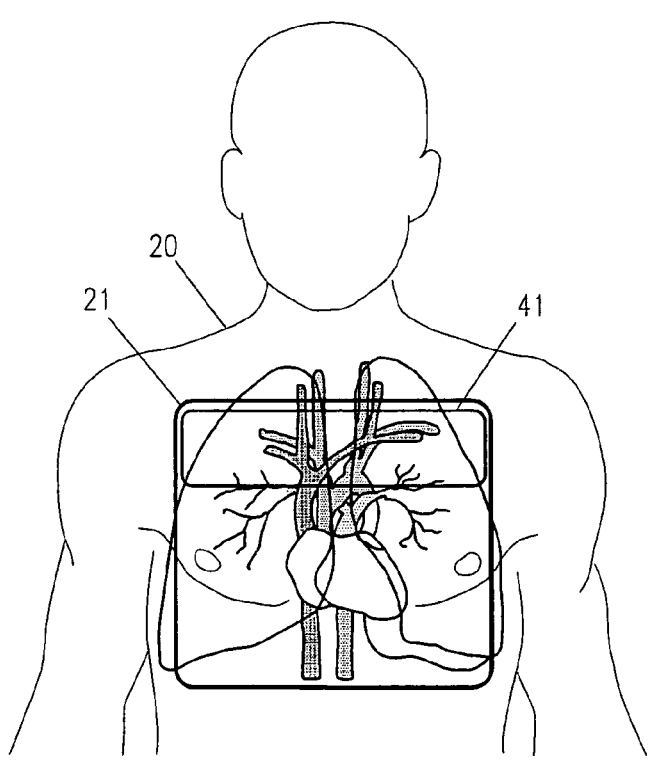
FIG. 4 is a second imaging field of view for the example cardiac monitoring system.
Figure 5:
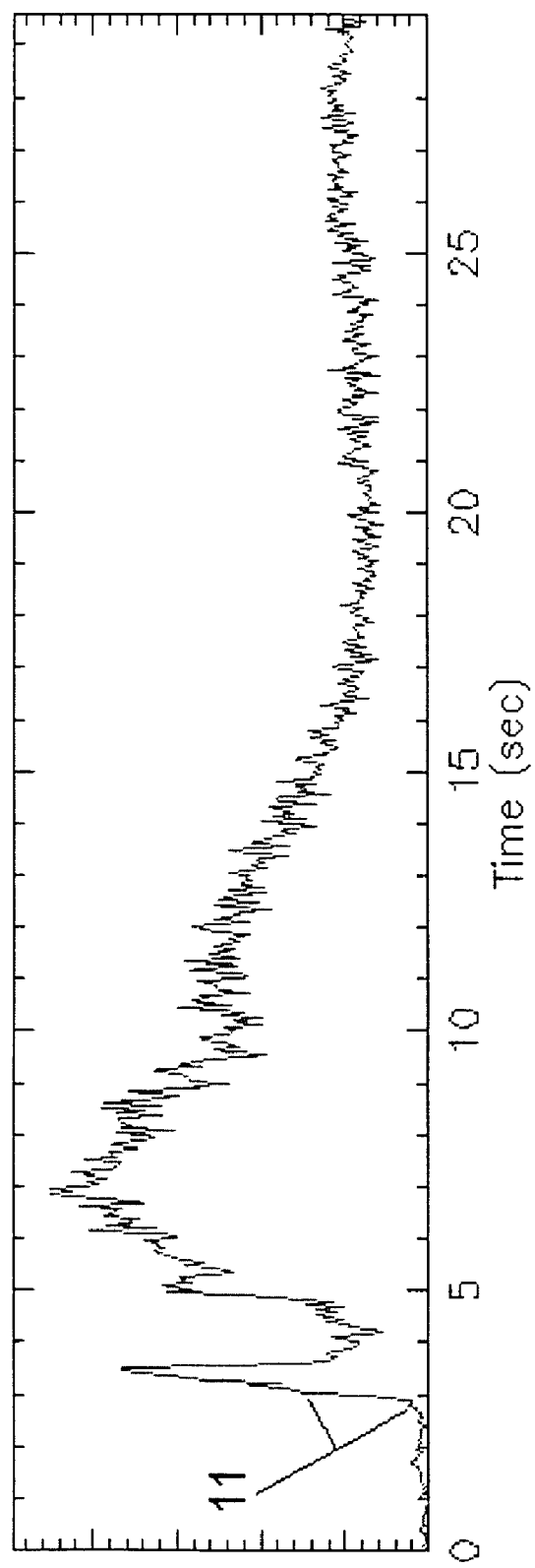
FIG. 5 is an activity profile of acquired data for the second field of view shown in FIG. 4.

The first trigger condition is representative of the steady state condition prior to the bolus of activity entering the field of view. The steady state activity level may be due to naturally occurring background radiation, environmental radiation, and/or residual radiation from prior studies on the observed patient 3) Second trigger condition: In FIG. 4, a focal distribution of events within a next region of interest 41 encompassing an outer edge of the field of view may be monitored, with a minimum delta of 1000 events per second as measured in 100 ms intervals, for 5 consecutive intervals. When this second trigger condition is detected, as depicted in FIG. 5 on the activity plot at 11, continue to the third trigger condition.

This second trigger condition is representative of the entry of the bolus of activity within the field of view, while isolating false trigger acceptance from alternative areas that could result from residual activity from prior studies entering the field of view in other regions.

Figure 6:
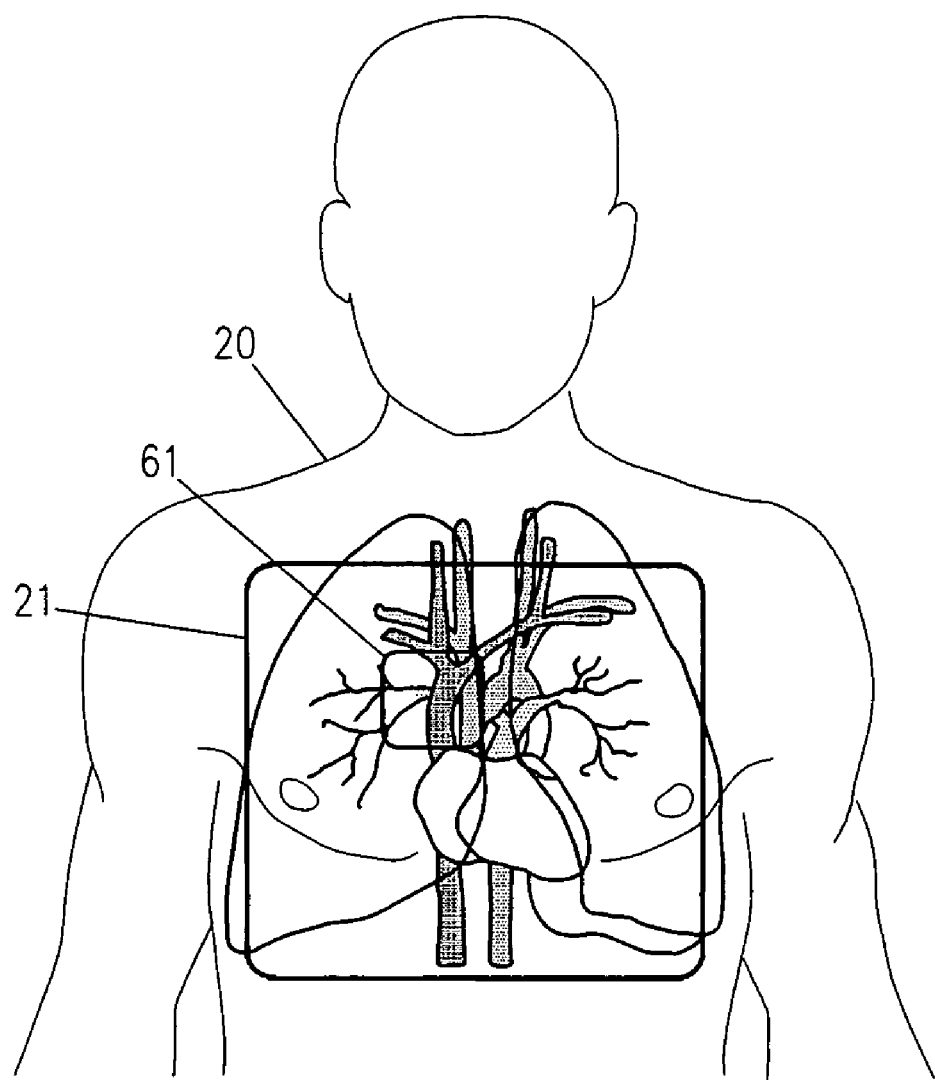
FIG. 6 is a third imaging field of view for the example cardiac monitoring system.
Figure 7:
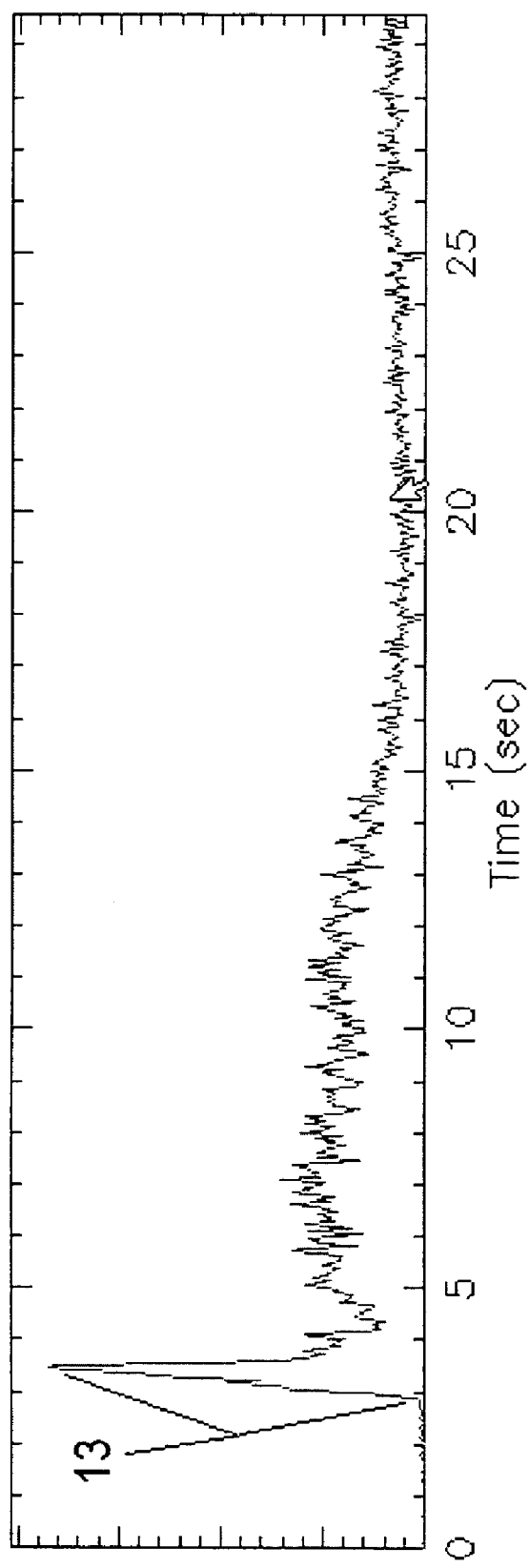
FIG. 7 is an activity profile of acquired data for the third imaging field of view shown in FIG. 6.

4) Third trigger condition: In FIG. 6, a focal distribution of events within a center defining a subsequent region of interest 61 may be monitored, with a maximum event delta of 10000 events per second as measured in 500 ms intervals, for 5 consecutive intervals. When this third trigger condition is met, as depicted in FIG. 7 on the activity plot at 13, continue to the fourth trigger condition.

This third trigger condition is representative of the transit of the bolus through the superior vena cava (SVC) prior to the right atrium of the heart.

Figure 8:
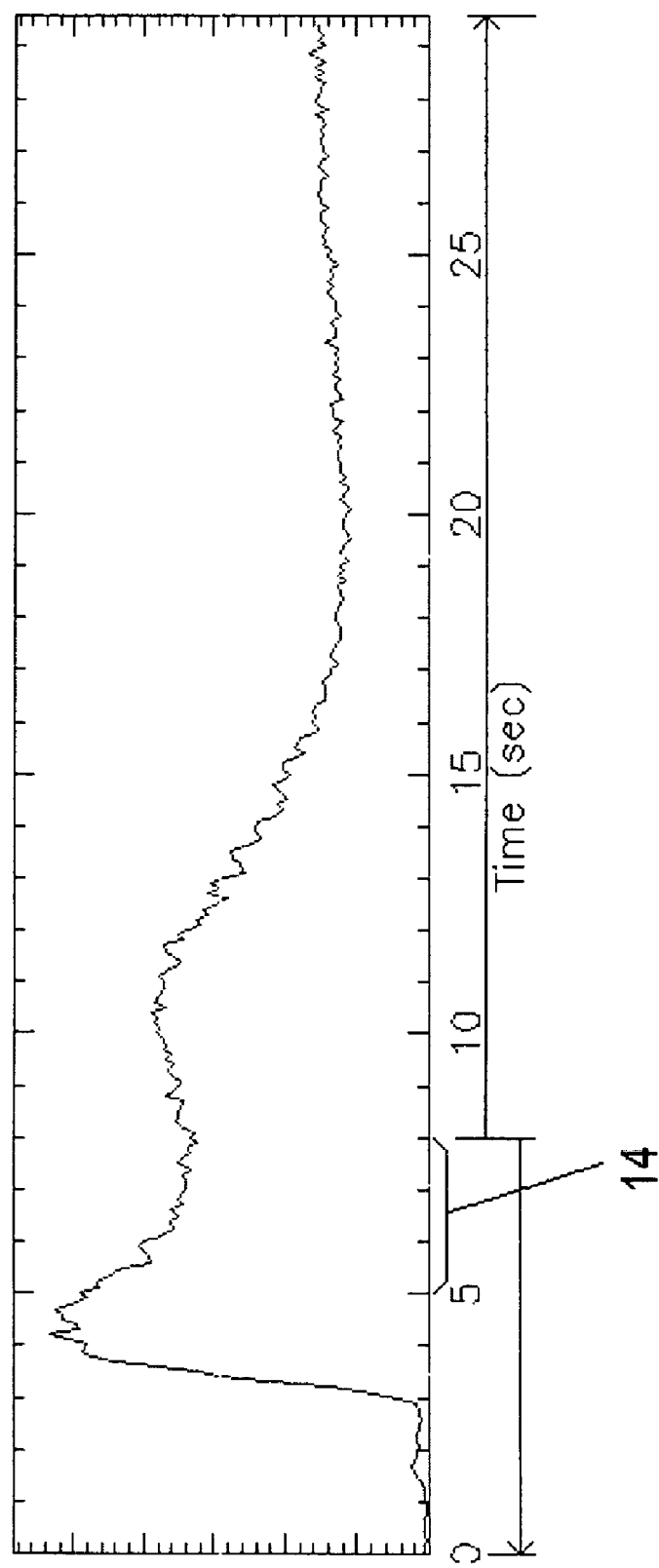
FIG. 8 is an activity profile of acquired data for the first imaging field of view shown in FIG. 2.

5) Fourth trigger condition: non-focal event distribution of events within full field of view as defined by the imager 21 for 3 seconds. When this fourth trigger condition is met, as depicted in FIG. 8 on the activity plot at 14, begin storage of all data within the entire field of view or field of interest (the final region of interest, for this example the same as 21 of FIG. 2) for 8 seconds prior to final condition and 22 seconds subsequent to condition.

This trigger condition is representative of the distribution of the activity within the right and left lung after passing through the right atrium, right ventricle, and pulmonary artery and prior to the left atrium, left ventricle, ascending aorta, and subsequently the rest of the circulatory system. The 8 second interval prior to this steady state and the 22 seconds after this steady state comprise a full cardiac first transit acquisition of 30 seconds. The stored 30 second interval encompasses the full first transit of the bolus and subsequent redistribution, consisting of bolus entry to the field of view and the subsequent transit through the superior vena cava, right atrium, right ventricle, pulmonary artery, lungs, left atrium, left ventricle, ascending aorta.

The first pass technique example described above is further described in more medical detail below:

A compact bolus of an appropriate radionuclide (Tc-99m) is injected and followed on its first passage through the central circulation. The injection site is typically the antecubital vein, though the external jugular may used. A suitable cannula is inserted and connected to a length of IV tubing. The free end of the tubing is connected to a three-way stopcock with a sufficient bore size to accommodate a rapid injection. The other two ports of the stopcock are connected to a syringe with the radionuclide and a syringe with saline solution respectively. The stopcock is turned so as to select the radionuclide syringe. The radionuclide in a volume of 0.5-1.5 cc is pushed into the IV tubing. The stopcock is then turned so as to select the saline syringe.

The saline solution, 10-30 cc, is injected at a continuous uninterrupted rate so as to flush the radionuclide bolus into the venous system. The bolus is imaged as it progresses successively through the superior vena cava, right atrium, right ventricle, pulmonary artery, lungs, left atrium, left ventricle, and ascending aorta. Subsequent processing of the stored data can provide measurement of right and left ventricular function. During processing a ventricular region of interest is defined. This ROI is used to generate a time activity curve. This time activity curve will show cyclic varying activity during the bolus transit with maximum at end diastoli and minimum at end systoli. This time activity curve is used to select the begin and end of 1 or more cardiac beats to be combined into a representative cardiac cycle for the ventricle. After correction for background activity, one or two new regions of interest may be defined encompassing the ventricle to determine the ejection fraction and other dynamic parameters such as filling and emptying rates and ventricular volumes. The representative cardiac cycle may be displayed as a repetitive cine to visualize cardiac wall motion. Additionally, the data may be analyzed to determine the presence of a left-to-right shunt abnormality.

Of course, the above techniques can be applied to various other medical analysis purposes, and the example use is provided for illustrative purposes only. The detailed example is for a nuclear cardiac first transit application. It easy to see, for one skilled in the art, how this could be extended to other dynamic acquisitions, including, but not limited to, cerebral blood flow, renal function, and venous transport, and other imaging modalities, including, but not limited to, magnetic resonance (MR), computed tomography (CT), ultrasound, and positron emission tomography (PET). Furthermore, the above technique can be applied in unison with the various techniques and features disclosed in co-pending application Ser. No. 11/140,337, filed on May 27, 2005; Ser. No. 11/140,336, filed on May 27, 2005; and Ser. No. 11/101,673, filed on Apr. 8, 2005 are each herein incorporated by reference.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention.

What is claimed is:

1. A method of acquiring medical data using a data acquisition system including a radiation detector, a storage device, and a processor, said method comprising the steps of:
    administering a particular bolus to a patient;
    acquiring, using said radiation detector under control of said processor, a first set of data from a monitored region that is a first region of interest;
    for n=2 to N, performing, based on the transition of the particular bolus through the patient, the steps of:
        a) detecting, utilizing the bolus and using said radiation detector under control of said processor, an $(n-1)^{th}$ trigger condition based on an $(n-1)^{th}$ set of data,
        b) defining, using said processor, an $n^{th}$ region of interest different from the $(n-1)^{th}$ region of interest in response to said $(n-1)^{th}$ trigger condition;
        c) acquiring, using said radiation detector under control of said processor, an $n^{th}$ set of data from the $n^{th}$ region of interest; and
        d) repeating steps (a) through (c) for each value of n, where N is equal to or greater than 3; and then
    recording said $N^{th}$ set of data into said storage device for including in said medical data.

2. The method of claim 1, wherein N is greater than or equal to 4.

3. The method of claim 2, wherein N is 4.

4. The method of claim 1, wherein a portion of each of said N sets of data are temporarily stored in a buffer for some period of time, and wherein said recording said $N^{th}$ set of data is performed by copying some portion of said $N^{th}$ set of data from said buffer to said storage device.

5. The method of claim 1, wherein each set of said acquired data includes temporal and spatial location information.

6. The method of claim 1, wherein, for every one of said regions of interest, said $n^{th}$ region of interest is different than said $(n-1)^{th}$ region of interest.

7. The method of claim 6, wherein each region of interest is a subset of said monitored region.

8. The method of claim 7, wherein said $N^{th}$ region of interest is also said monitored region.

9. The method of claim 1, wherein each region of interest is a subset of said monitored region.

10. A method of acquiring medical data using a data acquisition system including a radiation detector, a storage device, and a processor, said method comprising the steps of:
    acquiring, using said radiation detector under control of said processor, a first set of data from a monitored region that is a first region of interest;
    for n=2 to N, performing, the steps of:
        a) detecting, using said radiation detector under control of said processor, an $(n-1)^{th}$ trigger condition based on an $(n-1)^{th}$ set of data,
        b) defining, using said processor, an $n^{th}$ region of interest different from the $(n-1)^{th}$ region of interest in response to said $(n-1)^{th}$ trigger condition;
        c) acquiring, using said radiation detector under control of said processor, an $n^{th}$ set of data from the $n^{th}$ region of interest; and
        d) repeating steps (a) through (c) for each value of n, where N is equal to or greater than 3; and then
    recording said $N^{th}$ set of data into said storage device for including in said medical data, wherein,
    for every one of said regions of interest, said $n^{th}$ region of interest is different than said $(n-1)^{th}$ region of interest, and wherein
    each region of interest is a subset of said monitored region, and wherein
    said $N^{th}$ region of interest is also said monitored region.

11. A method of acquiring medical data using a data acquisition system including a radiation detector, a processor, and a storage device, said method comprising the steps of:
    using the radiation detector for acquiring data from a monitored region that is a first region of interest;
    using the radiation detector for acquiring data from a temporally arranged series of regions of interest based on the transition of a particular bolus injection traversing through said regions of interest; and storing, in said storage device, a portion of the data obtained from the last region of interest for including in said medical data, wherein each subsequent region of interest of the temporally arranged series of regions of interest is changed, using said processor, from the previous region of interest based on the data acquired from the previous region of interest.

12. The method of claim 11, wherein said acquired data includes temporal and spatial location information.

13. The method of claim 11, wherein, for each region of interest, each subsequent region of interest is different than the immediately preceding region of interest.

14. The method of claim 13, wherein each region of interest is a subset of said monitored region.

15. The method of claim 14 wherein the last region of interest is also said monitored region.

16. The method of claim 11, wherein each region of interest is a subset of said monitored region.

17. A method of acquiring medical data using a data acquisition system including a radiation detector, a processor, and a storage device, said method comprising the steps of:

using the radiation detector for acquiring data from a monitored region that is a first region of interest;

using the radiation detector for acquiring data from a temporally arranged series of regions of interest; and storing, in said storage device, a portion of the data obtained from the last region of interest for including in said medical data, wherein each subsequent region of interest of the temporally arranged series of regions of interest is changed, using said processor, from the previous region of interest based on the data acquired from the previous region of interest, wherein for each region of interest, each subsequent region of interest is different than the immediately preceding region of interest, and wherein each region of interest is a subset of said monitored region, and wherein the last region of interest is also said monitored region.

18. A data acquisition system for acquiring medical data, said system comprising:

a radiation detector configured to acquire data from a monitored region that is a first region of interest and then also for acquiring data from a temporally arranged series of regions of interest based on the transition of a particular bolus injection traversing through said regions of interest;

a buffer configured to temporarily store a portion of said acquired data; and a storage device, wherein said system is configured to acquire said data such that each subsequent region of interest of the temporally arranged series of regions of interest is automatically changed based on the data acquired from the previous region of interest, and wherein said system is further configured such that some portion of the data collected from the final region of interest is transferred from said buffer to said storage device for including in said medical data.

19. The system of claim 18, wherein said acquired data includes temporal and spatial location information.

20. The system of claim 18, wherein, for each region of interest, each subsequent region of interest is different than the immediately preceding region of interest, if any.

21. The system of claim 20, wherein each region of interest is a subset of said monitored region.

22. The system of claim 18, wherein each region of interest is a subset of said monitored region.

23. The system of claim 22, wherein the last region of interest is also said monitored region.

24. The system of claim 18, wherein the radiation detector acquires data from the temporally arranged series of regions of interest based on the transition of a single bolus.

25. A data acquisition system for acquiring medical data, said system comprising:

a radiation detector configured to acquire data from a monitored region that is a first region of interest and then also for acquiring data from a temporally arranged series of regions of interest;

a buffer configured to temporarily store a portion of said acquired data; and a storage device, wherein said system is configured to acquire said data such that each subsequent region of interest is automatically changed based on the data acquired from the previous region of interest, and wherein said system is further configured such that some portion of the data collected from the final region of interest is transferred from said buffer to said storage device for including in said medical data, and further wherein each region of interest is a subset of said monitored region, and wherein the last region of interest is also said monitored region.

26. A data acquisition system for acquiring medical data, said system comprising:

a radiation detector including a plurality of PMTs, said detector configured to acquire data including temporal and spatial location information from a monitored region that is a first region of interest and then also for acquiring data from a temporally arranged series of three or more regions of interest based on the transition of a particular bolus injection traversing through said three or more regions of interest, wherein each subsequent region of interest is different than the preceding region of interest, and wherein each region of interest is a subset of said monitored region;

a buffer configured to temporarily store a portion of said acquired data for a given time interval;

a storage device; and a processor configured to control the acquiring of said data such that each subsequent region of interest of the temporally arranged series of three or more regions of interest, different from the previous region of interest, is automatically selected based on the data acquired from the previous region of interest, wherein said processor is further configured to automatically issue a command to copy some portion of the data collected from the final region of interest from said buffer to said storage device for including in said medical data.

27. The system of claim 26, wherein the last region of interest is also said monitored region.

28. The system of claim 26, wherein the radiation detector acquires data from a temporally arranged series of three or more regions of interest based on the transition of a single bolus.

29. A data acquisition system for acquiring medical data, said system comprising:

a radiation detector including a plurality of PMTs, said detector configured to acquire data including temporal and spatial location information from a monitored region that is a first region of interest and then also for acquiring data from a temporally arranged series of three or more regions of interest, wherein each subsequent region of interest is different than the preceding region of interest, and wherein each region of interest is a subset of said monitored region;

a buffer configured to temporarily store a portion of said acquired data for a given time interval;

a storage device; and a processor configured to control the acquiring of said data such that each subsequent region of interest of the temporally arranged series of three or more regions of interest, different from the previous region of interest, is automatically selected based on the data acquired from the previous region of interest, wherein said processor is further configured to automatically issue a command to copy some portion of the data collected from the final region of interest from said buffer to said storage device for including in said medical data, wherein the last region of interest is also said monitored region.

30. A method of transforming an image of a body into medical data by using trigger conditions based on detecting and tracing a path of a particular radioactive bolus traversing through the body for monitoring a region of the body, said method comprising the steps of:

acquiring data from a first image of the body on a first trigger condition based on a first location of the bolus that is a first region of interest;

acquiring data from a second image of the body at a second trigger condition based on a second location of the bolus that is a second region of interest due to the bolus having traversed in the body to the second location from the first location;

acquiring data from at least one additional image of the body at an addition trigger condition based on an additional location of the bolus that is an additional region of interest due to the bolus having traversed in the body to said additional location; and storing a portion of the data obtained from at least the last region of interest for which data was acquired for including in said medical data representing a transformation of an image of the body at said last region of interest, wherein the location of a subsequent region of interest is determined based on the data acquired from the previous region of interest.

31. The method of claim 30, wherein said acquired data includes temporal and spatial location information.

32. The method of claim 30, wherein each region of interest is at least a subset of the monitored region.

* * * * *